US008054522B2

(12) United States Patent
Velger et al.

(10) Patent No.: US 8,054,522 B2
(45) Date of Patent: Nov. 8, 2011

(54) OSCILLATING MIRROR HAVING A PLURALITY OF EIGENMODES

(75) Inventors: Mordekhai Velger, Rehovot (IL); Izhak Bucher, Haifa (IL); Yaron Zimmerman, Kiryat Tivon (IL)

(73) Assignee: Technion Research & Development Foundation Ltd., Haifa (IL)

( * ) Notice: Subject to any disclaimer, the term of this patent is extended or adjusted under 35 U.S.C. 154(b) by 1374 days.

(21) Appl. No.: 10/554,002

(22) PCT Filed: Apr. 20, 2004

(86) PCT No.: PCT/IL2004/000336
§ 371 (c)(1),
(2), (4) Date: Aug. 18, 2006

(87) PCT Pub. No.: WO2004/095111
PCT Pub. Date: Nov. 4, 2004

(65) Prior Publication Data
US 2007/0139750 A1 Jun. 21, 2007

(51) Int. Cl.
*G02B 26/02* (2006.01)
(52) U.S. Cl. ...................................... 359/223
(58) Field of Classification Search ........... 359/290, 359/291, 292, 295, 298, 223, 224, 214, 230
See application file for complete search history.

(56) References Cited

U.S. PATENT DOCUMENTS

| 3,727,183 | A | * | 4/1973 | LeMay | 382/218 |
| 4,001,658 | A | * | 1/1977 | Frenk | 318/37 |
| 4,958,894 | A | | 9/1990 | Khowles | |
| 6,704,475 | B2 | * | 3/2004 | Jin et al. | 385/18 |
| 6,947,189 | B2 | * | 9/2005 | Hagelin et al. | 359/201.1 |
| 7,209,118 | B2 | * | 4/2007 | Shahoian et al. | 345/156 |
| 2001/0055146 | A1 | | 12/2001 | Atobe et al. | |

FOREIGN PATENT DOCUMENTS

| DE | 19728598 | * | 2/1999 |
| DE | 10119073 | | 12/2002 |
| WO | WO 98/44571 | | 10/1998 |
| WO | WO 2004/095111 | | 11/2004 |

OTHER PUBLICATIONS

International Preliminary Report on Patentability Dated Jun. 9, 2005 From the International Preliminary Examining Authority Re. Application No. PCT/IL2004/000336.
International Search Report and the Written Opinion Dated Oct. 13, 2004 From the International Searching Authority Re. Application No. PCT/IL2004/000336.
Lucente et al. "New Approaches to Holographic Video", SPIE Proceedings Holographics International '92, XP002298455, 1732: 377-386, Jul. 1992.

* cited by examiner

*Primary Examiner* — Scott J Sugarman
*Assistant Examiner* — Tuyen Tra

(57) ABSTRACT

Geometric-waveform oscillator for processing light, the geometric waveform oscillator including a plurality of masses, at least one force producing element, and a plurality of elastic elements, each of the force producing elements being coupled with a respective one of the masses, at least one of the masses including a light processing module, each of the force producing elements applying a force to the masses, the elastic elements coupling the masses together, the elastic elements coupling the masses with a respective support, wherein the mass values of the masses, the force values of the forces, and the stiffness coefficients of the elastic elements, are selected such that the light processing module oscillates according to the geometric-waveform.

15 Claims, 8 Drawing Sheets

US 8,054,522 B2

OSCILLATING MIRROR HAVING A PLURALITY OF EIGENMODES

FIELD OF THE DISCLOSED TECHNIQUE

The disclosed technique relates to optical devices in general, and to a system and method to provide non-sinusoidal oscillatory motion to a scanner, in particular.

BACKGROUND OF THE DISCLOSED TECHNIQUE

Oscillating mirrors are employed to scan objects and raster-scan displays. Such a mirror is generally connected to two vibrating flexural beams, thereby forming a single degree-of-freedom (DOF) structure, wherein the structure has a single torsional resonance frequency. Such scanners oscillate according to a sinusoidal waveform. The high gain (i.e., large compliances) which is exhibited by a second order system at its natural frequency (when there is a small amount of damping), gives rise to a significant angular deflection under a moderate sinusoidal torque.

Sinusoidal motion of the mirror reflects the light beam in a non-uniform manner, thereby yielding non-uniform intensity and hence, a low level of performance. It is possible to improve the scanning performance, if the mirror oscillates according to a triangular waveform. However, the value of the torque which is to be applied to the mirror in order to provide oscillatory motion having the triangular waveform, is approximately two orders of magnitude greater than in the case of sinusoidal motion. In large scale applications, where large torques can be produced, it is possible to produce this additional torque. However in small scale applications, such as micro-electromechanical systems (MEMS), due to the inherently small dimensions and the limitation of the commonly used electrostatic excitation, it is much more difficult to provide the needed torque.

SUMMARY OF THE DISCLOSED TECHNIQUE

It is an object of the disclosed technique to provide a novel method and system for oscillating the mirror of a scanner according to a geometric-waveform.

In accordance with the disclosed technique, there is thus provided a geometric-waveform oscillator for processing light. The geometric-waveform oscillator includes a plurality of masses, at least one force producing element, and a plurality of elastic elements. Each of the force producing elements is coupled with a respective one of the masses. At least one of the masses includes a light processing module. Each of the force producing elements applies a force to the masses. The elastic elements couple the masses together and the masses with a respective support. The mass values of the masses, the force values of the forces, and the stiffness coefficients of the elastic elements, are selected such that the light processing module oscillates according to the geometric-waveform.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a multi-degree-of-freedom system, wherein one of whose elements (e.g., a mirror, a directional radiation source, a directional sensor) oscillates according to a triangular waveform. The individual masses of the system, the stiffness coefficients of the elastic elements of the system, and the waveform of the force which excites the system are selected, such that the mirror oscillates according to the triangular waveform. In the description herein below, the term "mass" is used to specify both a physical object and the weight of the physical object.

Figure 1:
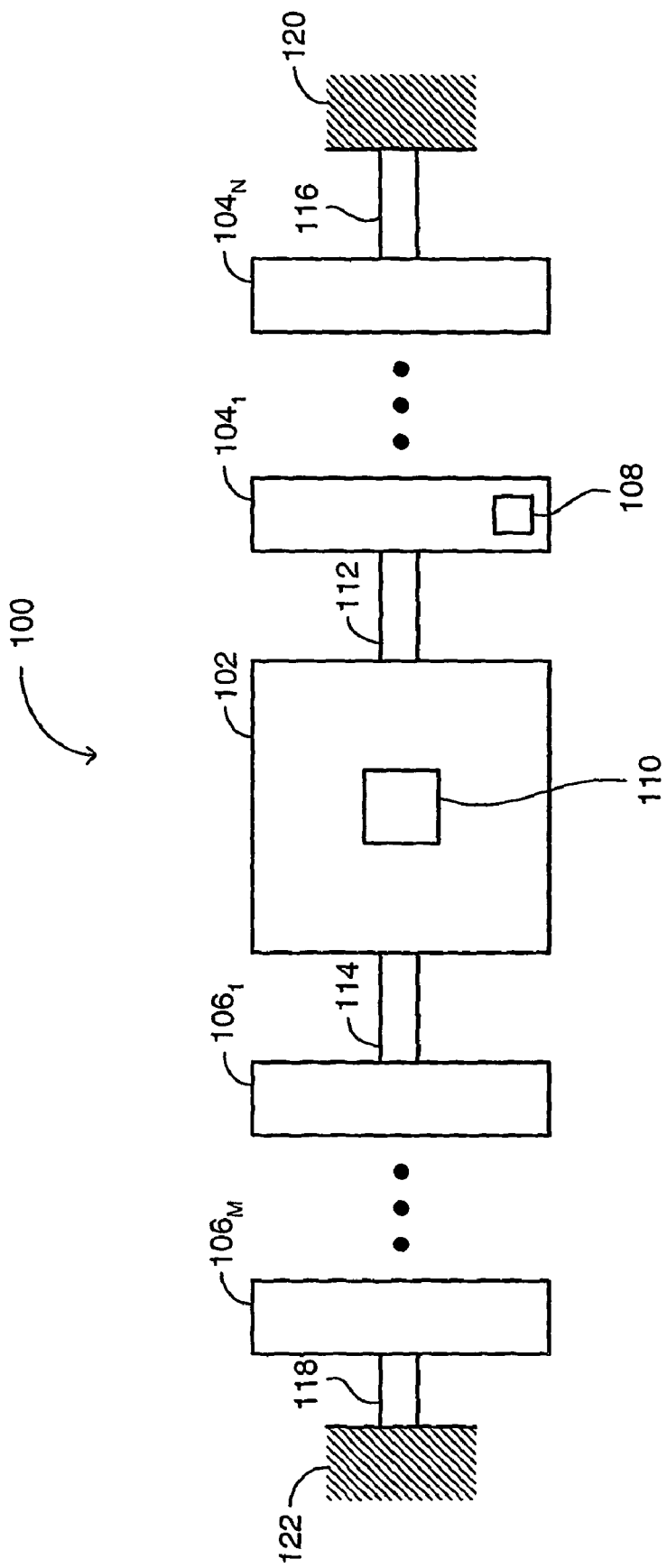
FIG. 1 is a schematic illustration of a scanner, constructed and operative in accordance with an embodiment of the disclosed technique.

Reference is now made to FIG. 1, which is a schematic illustration of a scanner, generally referenced 100, constructed and operative in accordance with an embodiment of the disclosed technique. Scanner 100 includes a mirror 102, a plurality of masses $104_1$ and $104_N$, a plurality of masses $106_1$ and $106_M$, a plurality of actuators 108 and 110, beams 112, 114, 116 and 118, and supports 120 and 122. The values of the indices M and N can be either the same or different.

Beam 112 is coupled with mirror 102 and with mass $104_1$. Beam 114 is coupled with mirror 102 and with mass $106_1$. Masses $104_1$ and $104_N$ are coupled there between by a plurality of beams (not shown), similar to beam 112. Masses $106_1$ and $106_M$ are coupled there between by a plurality of beams (not shown), similar to beam 112. Beam 116 is coupled with mass $104_N$ and with support 120. Beam 118 is coupled with mass $106_M$ and with support 122. Actuator 108 is coupled with mass $104_1$. Actuator 110 is coupled with mirror 102. In case mirror 102 is located at a geometric center of scanner 100, mirror 102 can be regarded as a center mass.

Each of beams 112, 114, 116 and 118, and the beams which couple masses $104_1$ and $104_N$ and masses $106_1$ and $106_M$, is made of a substantially elastic material having a stiffness coefficient $k_i$. Each of beams 112, 114, 116 and 118, and the beams which couple masses $104_1$ and $104_N$ and masses $106_1$ and $106_M$, can deflect either linearly or in a planar, spatial or angular fashion.

Each of actuators (i.e., force producing elements) 108 and 110 is a mechanical, electronic, electromechanical, electrostatic, thermodynamic, biomechanical, fluidic element and the like, such as an electromagnet, piezoelectric crystal, electric motor, bimetallic element, hydraulic motor, fluid impeller, and the like. One or both of actuators 108 and 110 apply forces to either one or both of mass $104_1$ and mirror 102, respectively, thereby setting mirror 102, masses $104_1$ and $104_N$ and masses $106_1$ and $106_M$ in motion. The values of masses $104_1$ and $104_N$, $106_1$ and $106_M$, the stiffness coefficients $k_i$ of beams 112, 114, 116 and 118, and the beams which couple masses 1 04 and 104N and masses $106_1$ and $106_M$, and the waveform of the forces applied by actuators 108 and 110, are selected such that mirror 102 oscillates according to a geometric (i.e., non-trigonometric) waveform, such as a triangular waveform (e.g., symmetric or asymmetric), non-sinusoidal waveform, square waveform, and the like. Alternatively, either one or both supports can be replaced by an actuator.

Figure 2:
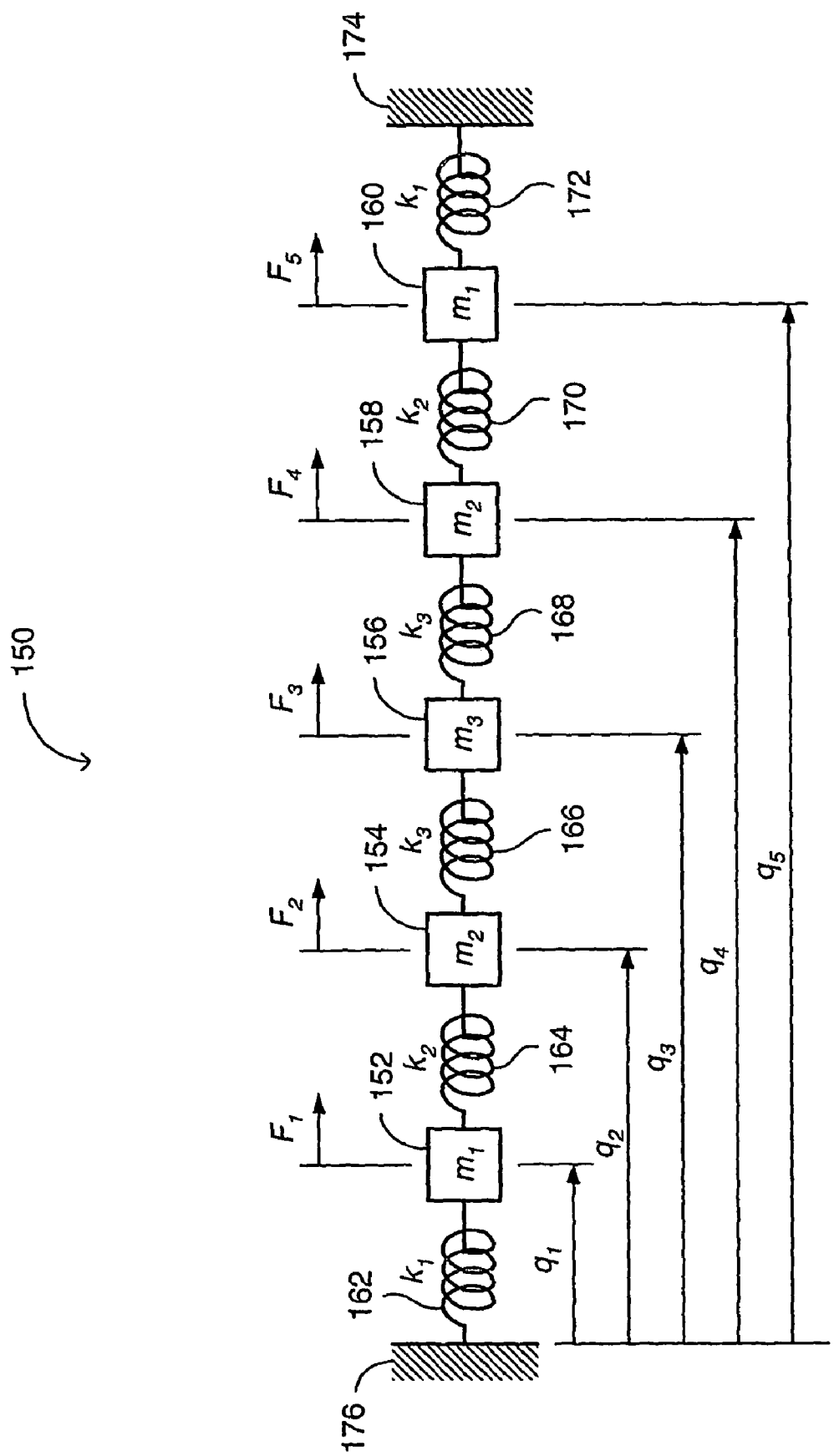
FIG. 2 is a schematic illustration of a five degree of freedom mathematical model of a system similar to the system of FIG. 1.

Reference is now made to FIG. 2, which is a schematic illustration of a five DOF mathematical model of a system similar to the system of FIG. 1, generally referenced 150. Mathematical model 150 includes masses 152, 154, 156, 158 and 160, springs 162, 164, 166, 168, 170 and 172, and supports 174 and 176. Each of masses 152 and 160 has a value $m_1$. Each of masses 154 and 158 has a value $m_2$. Mass 156 has a value $m_3$ and is similar to mirror 102 (FIG. 1). The spring constant (i.e., stiffness coefficient) of each of springs 162 and 172 is referenced $k_1$. The spring constant of each of springs 164 and 170 is referenced $k_2$. The spring constant of each of springs 166 and 168 is referenced $k_3$.

Spring 162 is coupled with mass 152 and with support 176. Spring 164 is coupled with masses 152 and 154. Spring 166 is coupled with masses 154 and 156. Spring 168 is coupled with masses 156 and 158. Spring 170 is coupled with masses 158 and 160. Spring 172 is coupled with mass 160 and with support 174.

The coordinates of masses 152, 154, 156, 158 and 160 relative to support 176, are referenced $q_1$, $q_2$, $q_3$, $q_4$, and $q_5$, respectively. When masses 152, 154, 156, 158 and 160 are set in motion, forces $F_1$, $F_2$, $F_3$, $F_4$, and $F_5$, respectively, act thereon.

Since mathematical model 150 is symmetric, the mode shapes (i.e., deformation shapes) thereof can be symmetric (i.e., $\phi_{sym}$) and anti-symmetric (i.e., $\phi_{asym}$), which are expressed by, $$\phi_{sym} = (\beta_1, \beta_2, \beta_3, \beta_2, \beta_1)^T \quad (1)$$

and $$\phi_{asym} = (\alpha_1, \alpha_2, 0, -\alpha_2, -\alpha_1)^T \quad (2)$$

where $\alpha$ and $\beta$ are the entries in the eigenvectors or columns of the modal matrix of mathematical model 150.

The equation of motion of masses 152, 154, 156, 158 and 160 is, $$\begin{bmatrix} m_1 & 0 & 0 & 0 & 0 \\ 0 & m_2 & 0 & 0 & 0 \\ 0 & 0 & m_3 & 0 & 0 \\ 0 & 0 & 0 & m_2 & 0 \\ 0 & 0 & 0 & 0 & m_1 \end{bmatrix} q'' + \begin{bmatrix} k_1+k_2 & -k_2 & 0 & 0 & 0 \\ -k_2 & k_2+k_3 & -k_3 & 0 & 0 \\ 0 & -k_3 & k_3+k_3 & -k_3 & 0 \\ 0 & 0 & -k_3 & k_3+k_2 & -k_2 \\ 0 & 0 & 0 & -k_2 & k_2+k_1 \end{bmatrix} q = F \quad (3)$$

where the units of the variables are as follows:
$m_1$, $m_2$, $m_3$, in Kg
q, in meters
q", in m/sec²
$k_1$, $k_2$, $k_3$, in N/m, and
F, in Newtons The natural frequencies $\omega_r$, r=1, 2, 3, 4, 5, of mathematical model 150 which is described by Equation 3 (i.e., the eigenvalues of Equation 3) and the eigenvectors $\phi_r$ thereof can easily be computed. By solving the following determinants:

$$|K-(n\omega_0)^2 M| = 0 \quad (4)$$

for n=1,2,3,4,5, $k_1$, $k_2$, $k_3$, $m_1$, and $m_2$, can be computed in terms of $m_3$. Thus, $$k_1 = \frac{25}{7}\omega_0^2 m_3 \quad (5)$$

$$k_2 = \frac{45}{7}\omega_0^2 m_3 \quad (6)$$

$$k_3 = \frac{15}{2}\omega_0^2 m_3 \quad (7)$$

$$m_1 = \frac{10}{7} m_3 \quad (8)$$

$$m_2 = \frac{15}{14} m_3 \quad (9)$$

where K and M are the corresponding matrices as defined in Equation 3.

It is noted that mathematical model 150 is a linear model. Equation 3 can be used to describe an angular system similar to mathematical model 150, if the units of the variables in Equation 3 are as follows:
$m_1$, $m_2$, $m_3$, in Kg–μm²
q, in radians
q", in rad/sec²
$k_1$, $k_2$, $k_3$, in μN–μm/rad, and
Q, in Nm If the natural frequencies are integer multiples of the resonance frequency $\omega_0$, and $m_3$ is given, then the following modal matrix, which is independent of masses 152, 154, 156, 158 and 160 and spring constants $k_1$, $k_2$ and $k_3$, is obtained, $$\phi = \begin{bmatrix} 1 & -3/2 & -9/4 & -1 & 1 \\ 4/3 & -1 & 1 & 2 & -4 \\ 10/7 & 0 & 5/2 & 0 & 6 \\ 4/3 & 1 & 1 & -2 & -4 \\ 1 & 3/2 & -9/4 & 1 & 1 \end{bmatrix} \quad (10)$$

It is seen that the modal matrix includes both symmetric and anti-symmetric deformation shapes (i.e., the columns of the matrix). In the anti-symmetric mode (i.e., the second and the fourth columns), mass 156 is stationary, as identified by zeros in these two columns. On the other hand, in the symmetric modes (i.e., the first, the third and the fifth columns), masses 152, 154, 156, 158 and 160 are in motion. Ordinarily, the response of mathematical model 150 depends on the excitation parameters. However, in the present case the relative motions of masses 152, 154, 156, 158 and 160 (i.e., the modes shapes of Equation 10), depend only on mass $m_3$.

It is noted that one or more damping elements (not shown) can be coupled with two respective anchoring points (not shown) of two elements of mathematical model 150, such as masses 152, 154, 156, 158 and 160, springs 162, 164, 166, 168, 170 and 172, supports 174 and 176, and with an actuator (not shown) similar to actuator 108 (FIG. 1). The damping element can be coupled either in series or in parallel with every of these two elements.

For example, the damping element can coupled between support 176 and spring 162 (i.e., in series), between spring 162 and mass 152 (i.e., in series), between the actuator and mass 156 (i.e., in series), between masses 154 and 156 (i.e., in parallel), and the like. If the damping element is incorporated with a system similar to system 100 (FIG. 1), the damping element influences the oscillation characteristics of a mirror similar to mirror 102. These damping elements can produce a damping factor which is a function of displacement, velocity, acceleration, impulse, and the like.

Figure 3:
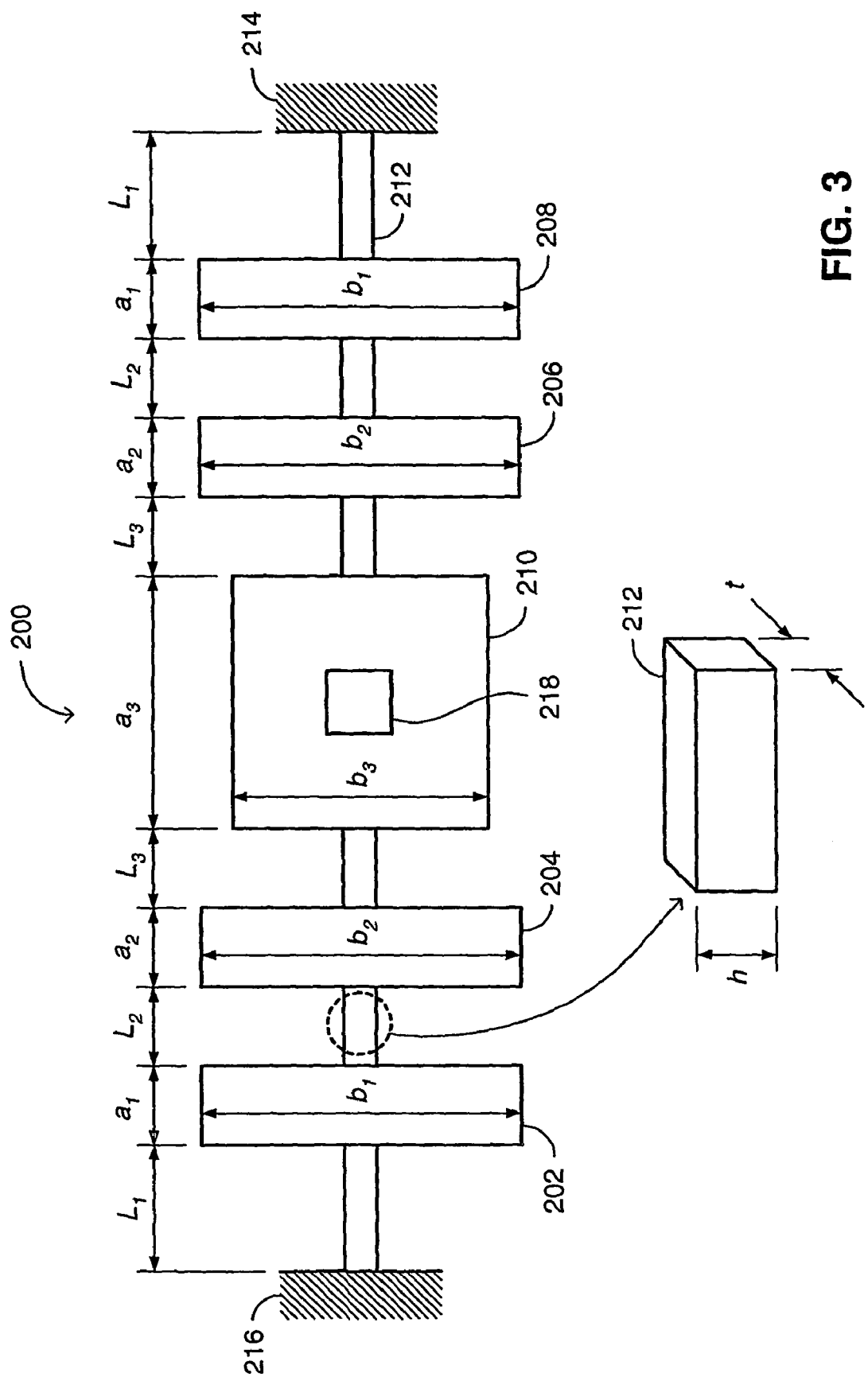
FIG. 3 is a schematic illustration of a micro-electromechanical-based system similar to the system of FIG. 1.
Figure 4A:
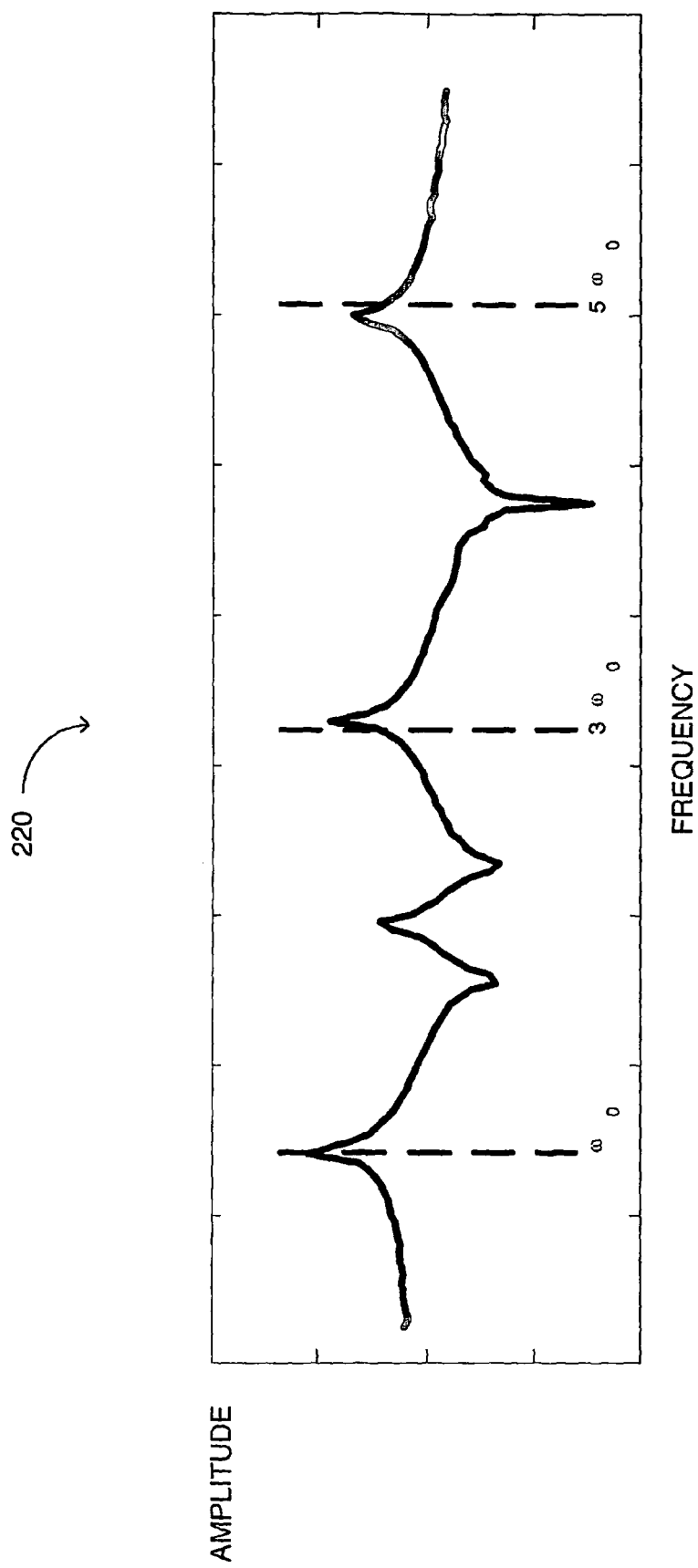
FIG. 4A is a schematic illustration of a plot of a frequency response of the mirror of the system of FIG. 3.
Figure 4B:
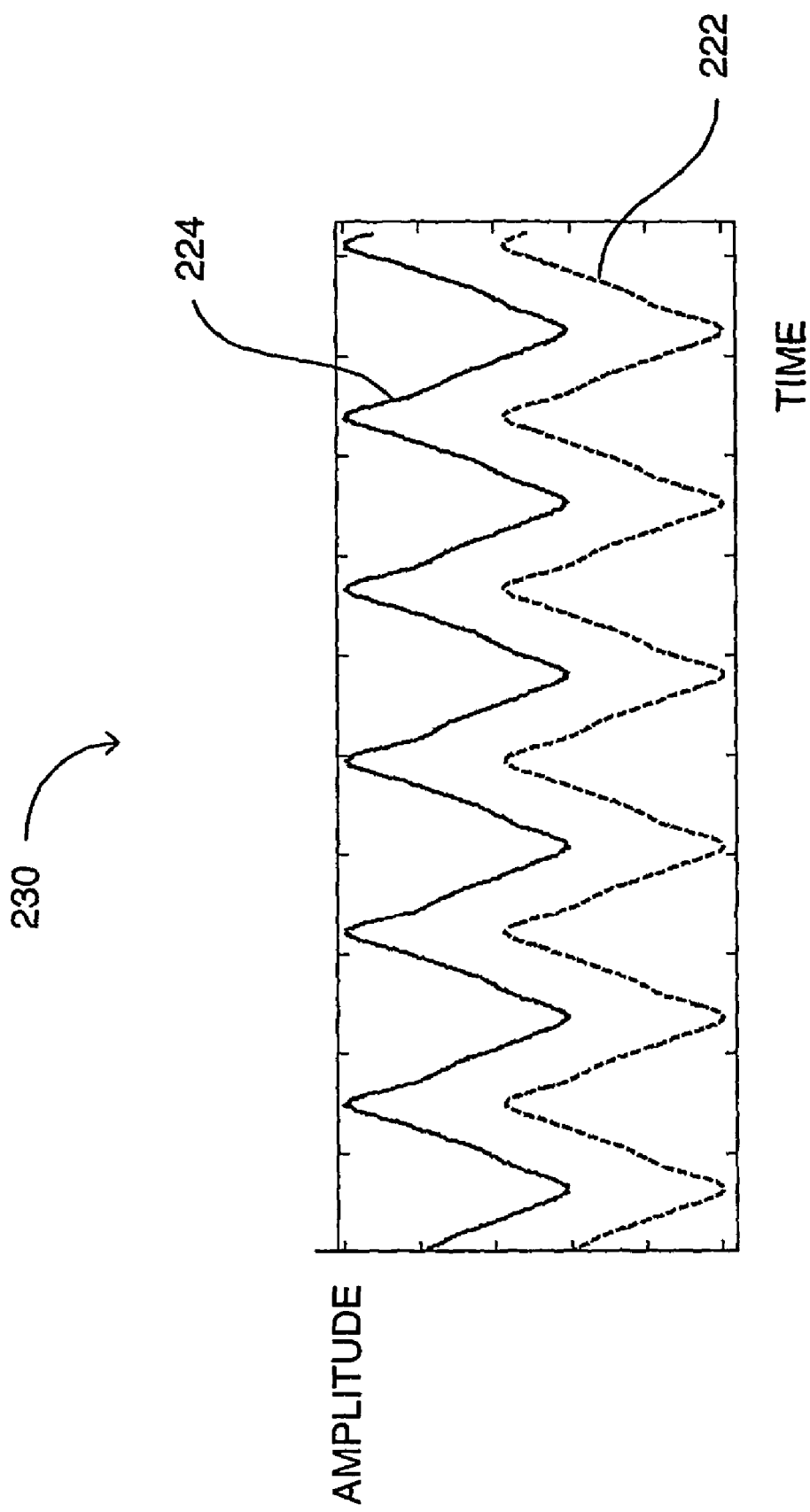
FIG. 4B is a schematic illustration of a plot of oscillations of the mirror of the system of FIG. 3 as a function of time.

Reference is now made to FIGS. 3, 4A, and 4B. FIG. 3 is a schematic illustration of a MEMS based system similar to the system of FIG. 1, generally referenced 200. FIG. 4A is a schematic illustration of a plot of a frequency response of the mirror of the system of FIG. 3, generally referenced 220. FIG. 4B is a schematic illustration of a plot of oscillations of the mirror of the system of FIG. 3 as a function of time, generally referenced 230.

System 200 includes masses 202, 204, 206 and 208, a mirror 210, a beam 212, supports 214 and 216 and an actuator 218. Beam 212 is coupled between supports 214 and 216. Masses 202, 204, 206 and 208, and mirror 210 are coupled with beam 212. Mirror 210 is located at an approximate center of beam 212. Masses 202 and 204 are located at one side of mirror 210 and masses 206 and 208 at the other side of mirror 210. Actuator 218 is coupled with mirror 210.

Each of masses 202 and 208 has a value $m_1$ and a mass moment of inertia $j_1$. Each of masses 204 and 206 has a value $m_2$ and a mass moment of inertia $j_2$. Mirror 210 has a mass $m_3$ and a mass moment of inertia $j_3$. The width and length of mass 202 is $a_1$, and $b_1$, respectively. The width and length of mass 204 is $a_2$, and $b_2$, respectively. The width and length of mass 206 is $a_2$, and $b_2$, respectively. The width and length (i.e., geometric characteristics) of mass 208 is $a_1$, and $b_1$, respectively. The width and length of mirror 210 is $a_3$, and $b_3$, respectively. The cross section of beam 212 is a rectangle having a width t and a height h.

The distance between mass 202 and support 216 is referenced $L_1$. The distance between masses 202 and 204 is referenced $L_2$. The distance between mass 204 and mirror 210 is referenced $L_3$. The distance between mirror 210 and mass 206 is referenced $L_3$. The distance between masses 206 and 208 is referenced $L_2$. The distance between mass 208 and support 214 is referenced $L_1$. The stiffness coefficients of sections of beam 212 having lengths $L_1$, $L_2$ and $L_3$, are referenced $k_1$, $k_2$ and $k_3$, respectively. The footprint of system 200 is a rectangle having a width and a length of approximately 100 µm and 2000 µm, respectively. In this case, masses 202, 204, 206 and 208, mirror 210 and beam 212 are part of a semiconductor laminate having a substantially uniform and small thickness (i.e., system 200 is a 2.5 dimension system).

Mathematical model 150 (FIG. 2) is a relatively simple model, albeit providing only a rough estimate of the required parameters. More accurate results can be obtained by applying a finite element analysis (FEA) to mathematical model 150. Following is an example of the results of a two-dimensional FEA applied to system 200. In this example, actuator 218 applies a variable force $F_v$ to mirror 210, where $$F_v = A_1 \cos(\omega_0 t + \gamma_1) + A_3 \cos(3\omega_0 t + \gamma_3) + A_5 \cos(5\omega_0 t + \gamma_5) \quad (11)$$

and where $A_1$, $A_3$, and $A_5$ designate amplitudes, and $\gamma_1$, $\gamma_3$, and $\gamma_5$ designate phase angles. The amplitudes $A_1$, $A_3$, and $A_5$ and phase angles $\gamma_1$, $\gamma_3$, and $\gamma_5$ are selected such that the amplitude of mirror 210 as a function of time, A(t), follows a substantially triangular waveform expressed by, $$A(t) = \frac{8A_0}{\pi^2} \sum_{n=1}^{\infty} \frac{1}{(2n-1)^2} \cos((2n-1)\omega t) = \qquad (12)$$

$$\frac{8A_0}{\pi^2} \left[ \frac{\cos(\omega t)}{1^2} + \frac{\cos(3\omega t)}{3^2} + \frac{\cos(5\omega t)}{5^2} + \ldots \right]$$

where $A_0$ is the desired amplitude and $\omega$ is the fundamental frequency of the triangular waveform. With reference to FIG. 4A, the resonance frequencies (i.e., the first three harmonics) of system 200 are found to be at $\omega_0$, $3\omega_0$, and $5\omega_0$. Plugging these three harmonics in Equation 12 yields the theoretical oscillations of mirror 210 as a function of time (i.e., curve 222 in FIG. 4B). Curve 224 graphically represents the actual amplitude f mirror 210 as a function of time. It is noted that the actual waveform of mirror 210 (i.e., curve 224) correlates well with the theoretical waveform (i.e., curve 222). It is further noted with reference to FIG. 4A, that the maxima of the amplitudes of mirror 210 are located at the respective first three harmonics.

The stiffness coefficients $k_1$, $k_2$ and $k_3$ corresponding to sections $L_1$, $L_2$ and $L_3$, respectively of beam 212, and the mass moments of inertia $j_1$, $j_2$ and $j_3$, are computed according to well known Equations found in Timoshenko S. P. and Goodier J. N., "*Theory of Elasticity*", Third Edition, McGraw-Hill Book Co., 1970. Thus, $$k_i = \frac{cGh^3 t}{L_i} \quad i = 1,2,3 \qquad (13)$$

and, $$J_i = \frac{a_i b_i s \rho (b_i^2 + s^2)}{12} \qquad (14)$$

where c is a numerical factor depending on the ratio h/t, G is the shear modulus of beam 212, s is the thickness of each of each of masses 202, 204, 206 and 208, and mirror 210, and $\rho$ is the density of each of masses 202, 204, 206 and 208, and mirror 210. Since system 200 is constructed on a chip, the thickness s of each of masses 202, 204, 206 and 208, and mirror 210 is substantially equal to the thickness t of beam 212. Likewise, the density of each of masses 202, 204, 206 and 208, and mirror 210 is substantially equal to the density of beam 212. Equations 13, and 14 are computed while neglecting the warping function correction for estimating the torsional spring rate, as shown in Basler K., and Kollbrunner C. F., "*Torsion in Structures*", Springer Verlag, New York, 1969.

As shown in Equations 13, and 14, the stiffness coefficient k depends on h, t and L, while the mass moment of inertia depends on a, b and s. Due to redundancy of the physical dimensions, some of the parameters of system 200 have to be assumed beforehand. Assuming the following values and substituting them in equations 13 and 14, $j_3 = 1.8238 \times 10^{-5}$ Kg-µm²  h=10 µm t=s=15 µm  $b_1 = b_2 = 600$ µm $b_3 = 500$ µm $\rho = 2.332e-15 \times 10^{-15}$ Kg/µm³, and $G = 8.831E4 \times 10^4$ Kg/µm-s² the gaps between masses 202, 204, 206 and 208, mirror 210, and supports 214 and 216, and the width of masses 202, 204, 206 and 208, mirror 210, are calculated as follows:

$L_1 = 44.9\ \mu m$ $L_2 = 24.9\ \mu m$ $L_3 = 21.4\ \mu m$ $a_1 = 413.5\ \mu m$ $a_2 = 210.2\ \mu m$, and $a_3 = 500\ \mu m$ Assuming a first resonance frequency of $\omega_0 = 15$ kHz for system 200, and solving Equations 5, 6, 7, 8 and 9, the following values for the stiffness coefficients $k_1$, $k_2$, $k_3$, corresponding to portions $L_1$, $L_2$, and $L_3$, respectively, of beam 212, $m_1$ for mass moments of inertia of masses 202 and 208 and $m_2$, for mass moments of inertia of masses 204 and 206 are obtained:

$k_1 = 0.5786\ N\text{-}\mu m/rad$ $k_2 = 1.041\ N\text{-}\mu m/rad$ $k_3 = 1.215\ N\text{-}\mu m/rad$ $m_1 = 2.6054 \times 10^{-4}\ Kg\text{-}\mu m^2$, and $m_2 = 1.9541 \times 10^{-4}\ Kg\text{-}\mu m^2$ where the mass $m_3$ is replaced by the mass moment of inertia $j_3$.

Figure 5:
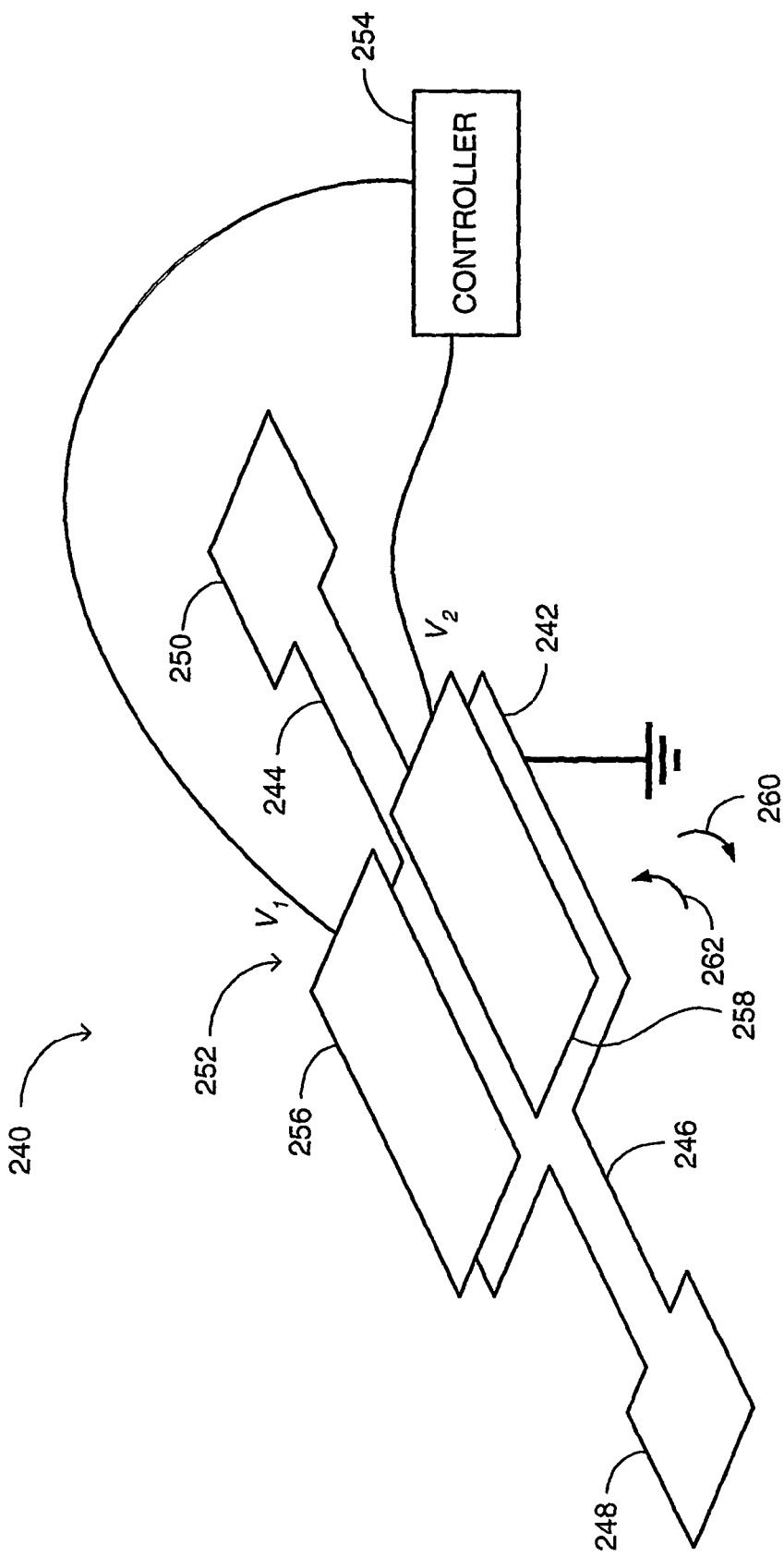
FIG. 5 is a schematic illustration of a scanner, constructed and operative in accordance with another embodiment of the disclosed technique.

Reference is now made to FIG. 5, which is a schematic illustration of a scanner, generally referenced 240, constructed and operative in accordance with another embodiment of the disclosed technique. Scanner 240 includes a mirror 242, beams 244 and 246, supports 248 and 250, an actuator 252 and a controller 254. Actuator 252 includes electrodes 256 and 258.

Beam 244 is coupled with mirror 242 and with support 250. Beam 246 is coupled with mirror 242 and with support 248. Electrodes 256 and 258 are located on top of mirror 242. Electrodes 256 and 258 are coupled with controller 254. Mirror 242 is electrically grounded.

Controller 254 applies a voltage $V_1$ to electrode 256, where $$V_1 = V_0 + A_1 \cos(\omega_0 t + \gamma_1) + A_3 \cos(3\omega_0 t + \gamma_3) + A_5 \cos(5\omega t + \gamma_5) \quad (15)$$

and a voltage $V_2$ to electrode 258, where $$V_2 = V_0 - [A_1 \cos(\omega t + \gamma_1) + A_3 \cos(3\omega_0 t + \gamma^3) + A_5 \cos(5\omega_0 t + \gamma_5)] \quad (16)$$

where $V_0$ is a bias voltage, $A_1$, $A_3$, and $A_5$ designate amplitudes, and where $\gamma_1$, $\gamma_3$, and $\gamma_5$ designate phase angles. Mirror 242 oscillates relative to supports 248 and 250, in directions designated by arrows 260 and 262, in a substantially triangular waveform expressed by Equation 12 herein above.

Figure 6A:
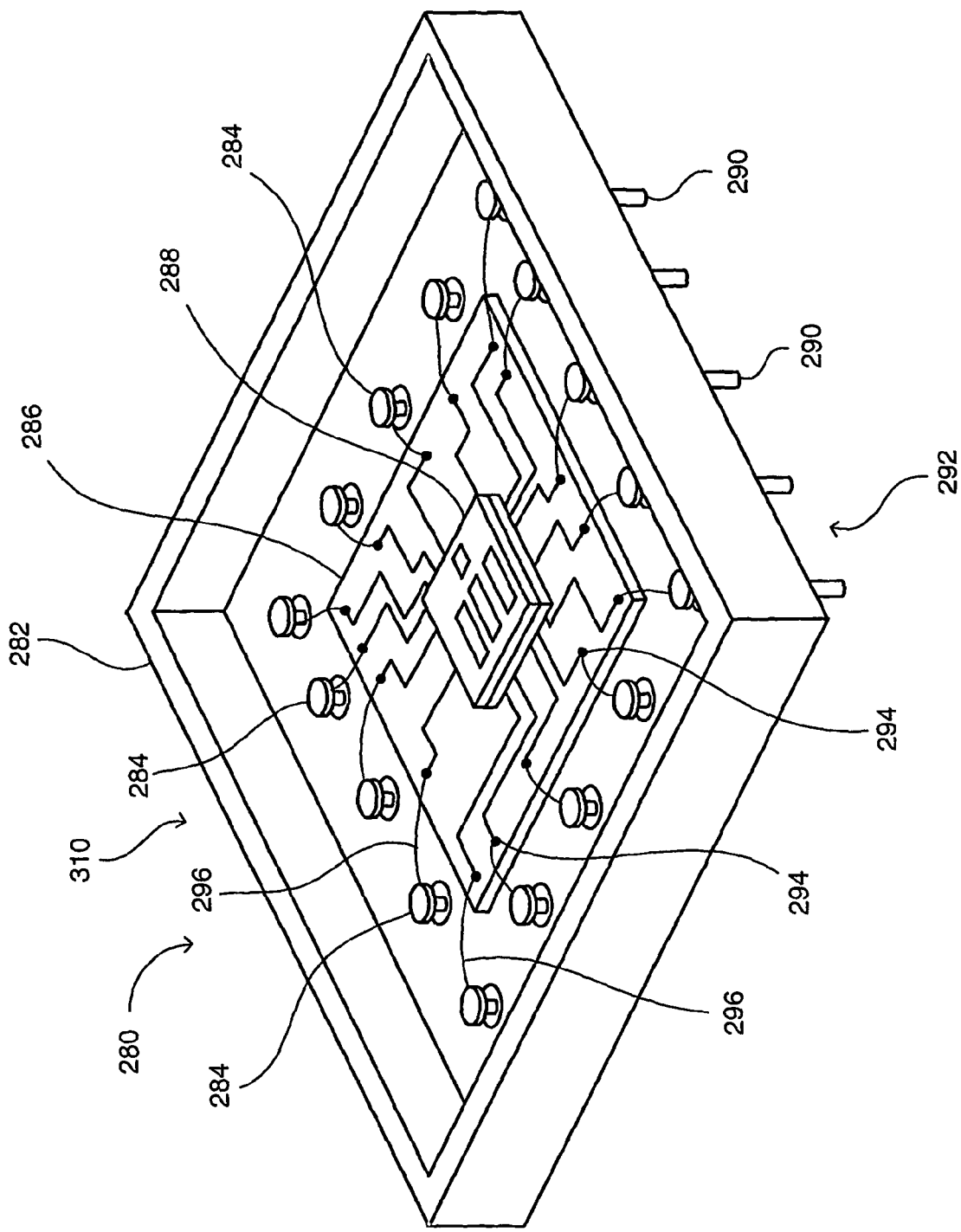
FIG. 6A is a schematic illustration of a packaged device generally referenced 280, including a plurality of the scanners of FIG. 1, constructed and operative in accordance with a further embodiment of the disclosed technique.
Figure 6B:
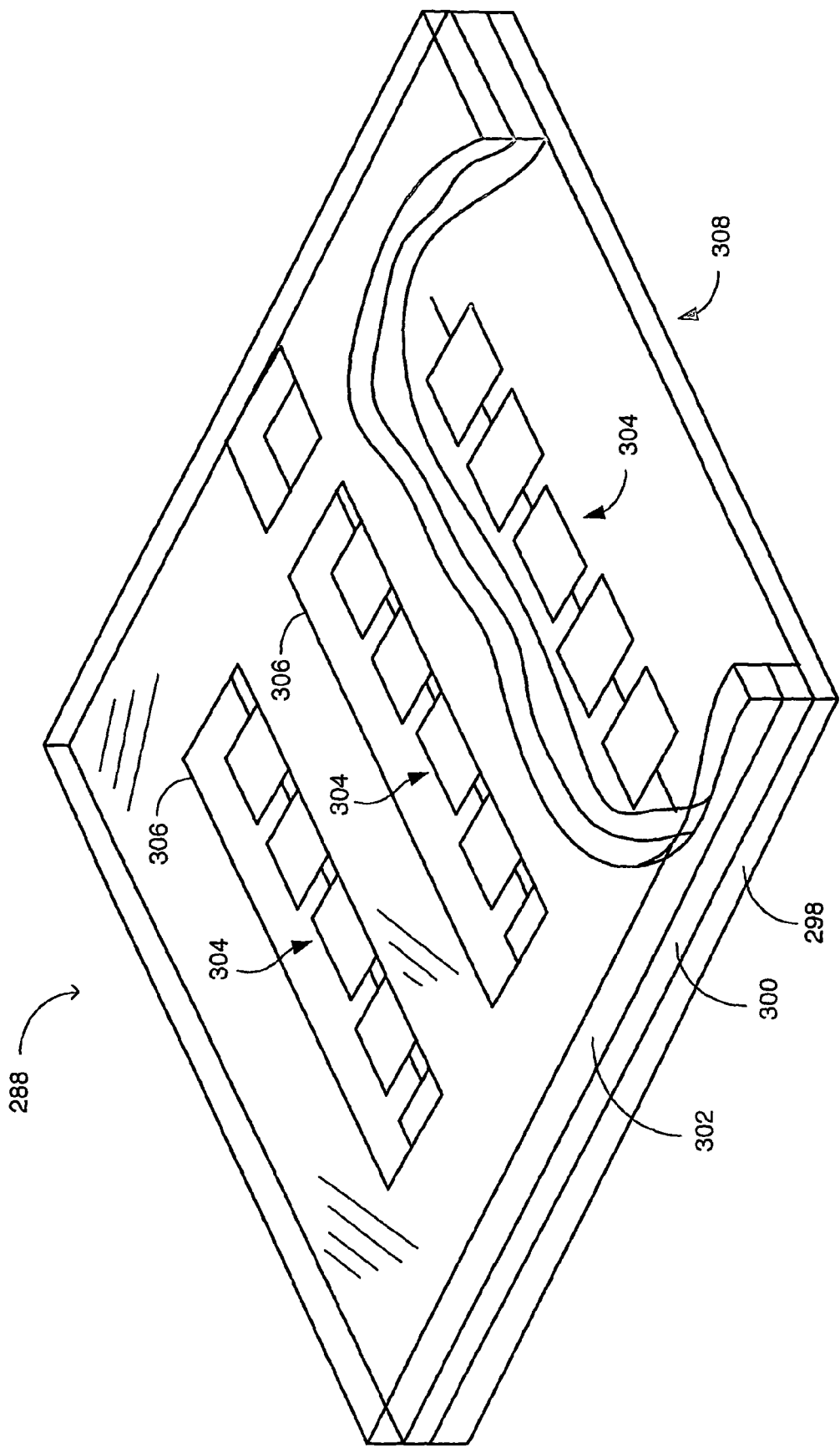
FIG. 6B is a schematic illustration of a broken section of a scanning MEMS of the packaged device of FIG. 6A.

Reference is now made to FIGS. 6A and 6B. FIG. 6A is a schematic illustration of a packaged device generally referenced 280, including a plurality of the scanners of FIG. 1, constructed and operative in accordance with a further embodiment of the disclosed technique. FIG. 6B is a schematic illustration of a broken section of a scanning MEMS of the packaged device of FIG. 6A.

With reference to FIG. 6A, packaged device 280 includes a housing 282, a plurality of electrical contacts 284, an integrated circuit (IC) 286, and a scanning MEMS 288. Each of electric contacts 284 includes a pin 290 which protrudes from a bottom side 292 of packaged device 280. Packaged device 280 can be mounted on another device (not shown) and make electric contact with this device, by pins 290. Scanning MEMS 288 is located on top of IC 286 such that electric terminals (not shown) of scanning MEMS 288 are connected to corresponding electric terminals of IC 286. Each of electric terminals 294 of IC 286 is connected to the respective electric contact 284 by a bonding wire 296.

With reference to FIG. 6B, scanning MEMS 288 includes a substrate 298, a protection layer 300 and an optically transparent layer 302. Substrate 298 can be made of a semiconductor, such as silicon, gallium arsenide, and the like. Substrate 298 includes a plurality of scanners 304 similar to scanner 100 (FIG. 1). Light can enter and exit each of scanning MEMS 288 through respective windows 306. Electric terminals (not shown) on a bottom side 308 of substrate 298 are connected to respective electric terminals (not shown) on a top side 310 of IC 286.

According to a further embodiment of the disclosed technique, the system is constructed on two or three dimensions where the actuators and masses are spread across a plane or a volume, thereby producing a waveform which can be measured in two or three spatial dimensions.

It will be appreciated by persons skilled in the art that the disclosed technique is not limited to what has been particularly shown and described hereinabove. Rather the scope of the disclosed technique is defined only by the claims, which follow.

The invention claimed is:

1. Geometric-waveform oscillator for processing light, the geometric-waveform oscillator comprising:
    at least one light processing module and a plurality of additional masses coupled to each other via a plurality of elastic elements, forming altogether a system of coupled oscillators characterized by n eigenvectors and n eignevalues respectively corresponding to n frequencies; and
    at least one force producing element configured for applying to said system of coupled oscillators a periodic driving force characterized by a fundamental frequency $\omega_o$;
    wherein for a given mass value of said light processing module, the mass values of said masses and the stiffness coefficients of said elastic elements, are selected such that (i) each of said n corresponding frequencies is an integer multiplication of said $\omega_o$, and (ii) at least one of said eigenvectors corresponds to oscillation of said light processing module, wherein the oscillation is a geometric-waveform selected from the list consisting of triangular; non-sinusoidal; and square.

2. The geometric-waveform oscillator according to claim 1, wherein said triangular waveform is symmetric.

3. The geometric-waveform oscillator according to claim 1, wherein said triangular waveform is asymmetric.

4. The geometric-waveform oscillator according to claim 1, wherein said light processing module reflects light.

5. The geometric-waveform oscillator according to claim 1, wherein said light processing module oscillates in an oscillatory motion selected form the list consisting of:
    linear;
    planar;
    spatial; and
    angular.

6. The geometric-waveform oscillator according to claim 1, wherein said at least one force producing element is selected from the list consisting of:
    mechanical;
    electronic;

electromechanical;
electrostatic;
biomechanical;
thermodynamic; and
fluidic element.

7. The geometric-waveform oscillator according to claim 1, wherein said at least one force producing element is located at said at least one support.

8. The geometric-waveform oscillator according to claim 1, wherein each of said masses, said at least one force producing element, and said elastic elements are incorporated with a microelectromechanical system.

9. The geometric-waveform oscillator according to claim 1, wherein said light processing module is located between respective two of said masses.

10. The geometric-waveform oscillator according to claim 9, wherein respective pairs of said at least two masses are symmetrically located at two sides of said light processing module.

11. The geometric-waveform oscillator according to claim 9, wherein respective pairs of said at least two located at two sides of said light processing module have substantially the same geometric and physical characteristics.

12. The geometric-waveform oscillator according to claim 1, wherein said masses and said elastic elements are located between two of said respective at least one support.

13. The geometric-waveform oscillator according to claim 1, wherein the densities of said masses and said elastic elements are substantially the same.

14. The geometric-waveform oscillator according to claim 1, wherein said at least one light processing module, said plurality of masses and said plurality of elastic elements form a system of five coupled oscillators characterized by five eigenvectors and five eigenvalues.

15. The geometric-waveform oscillator according to claim 1, wherein said periodic driving force is modulated according to a sum of cosines.

* * * * *